Patented Oct. 8, 1946

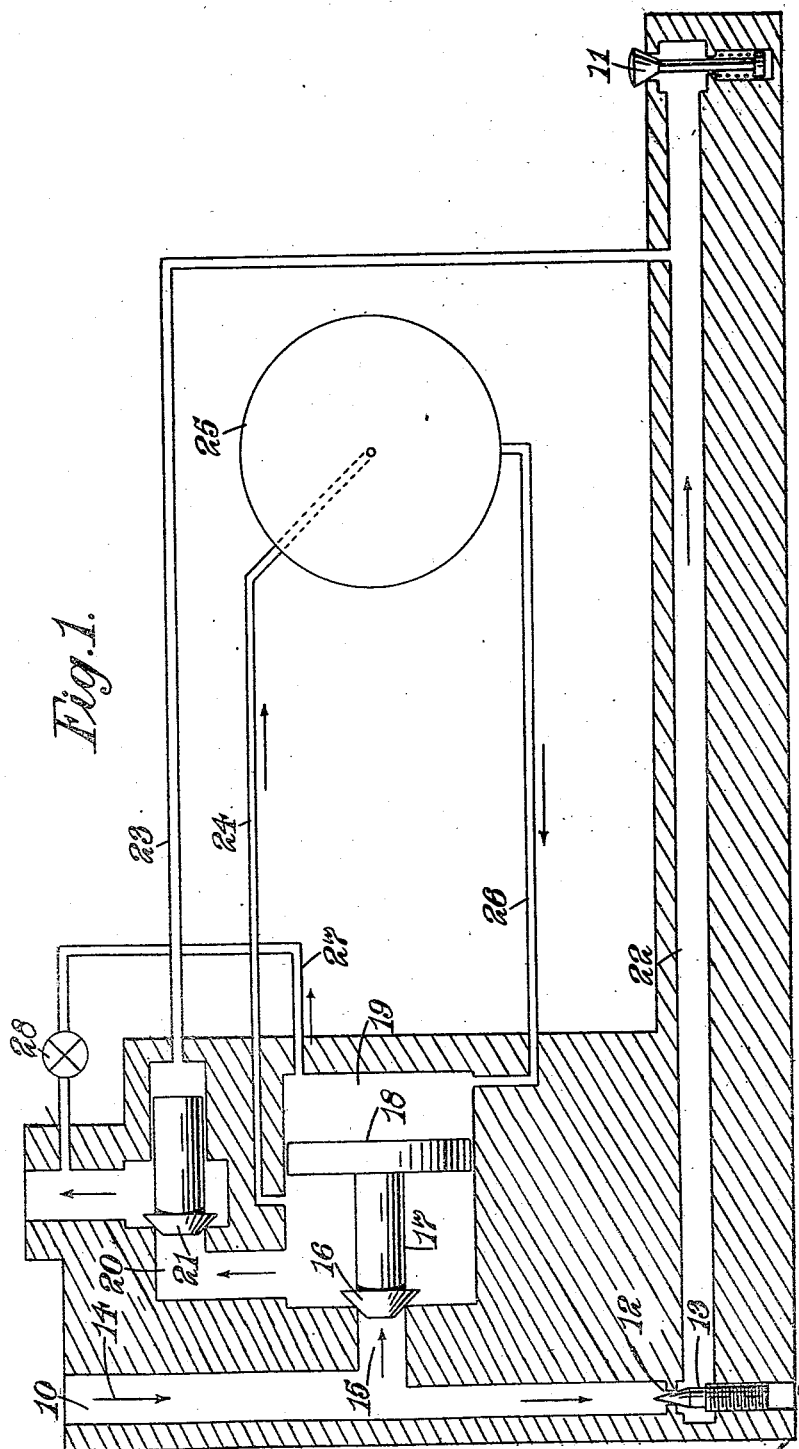

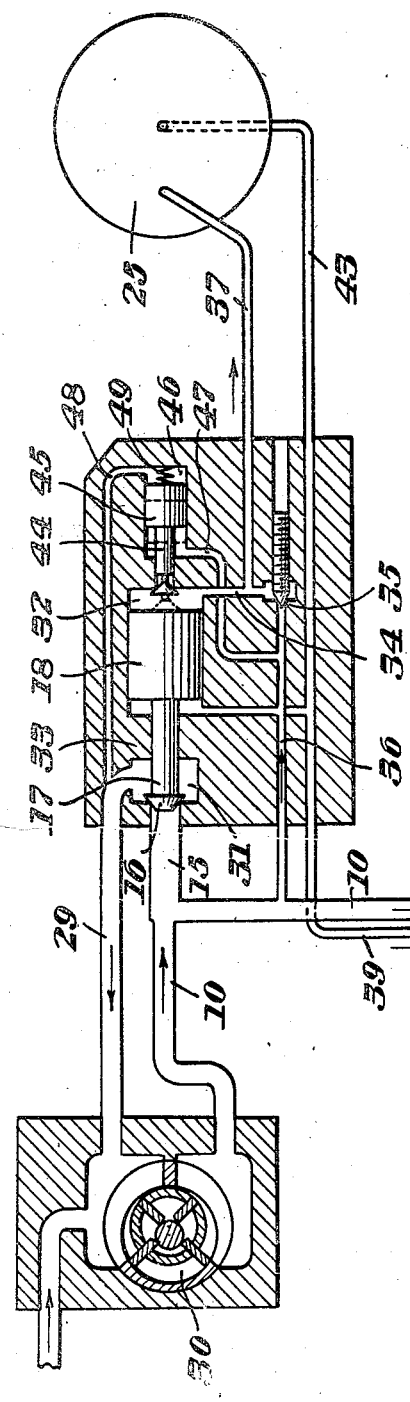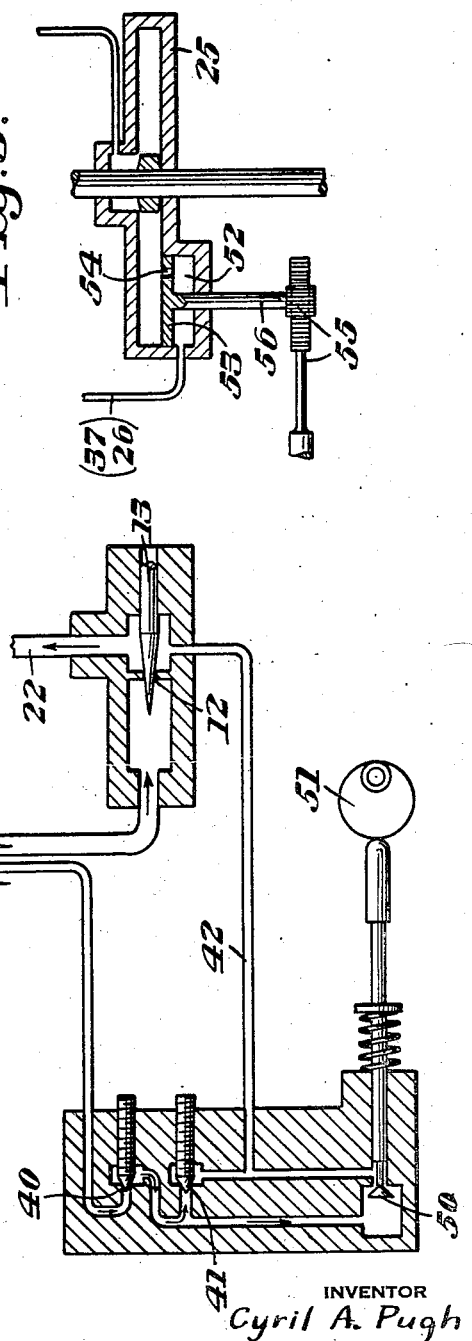

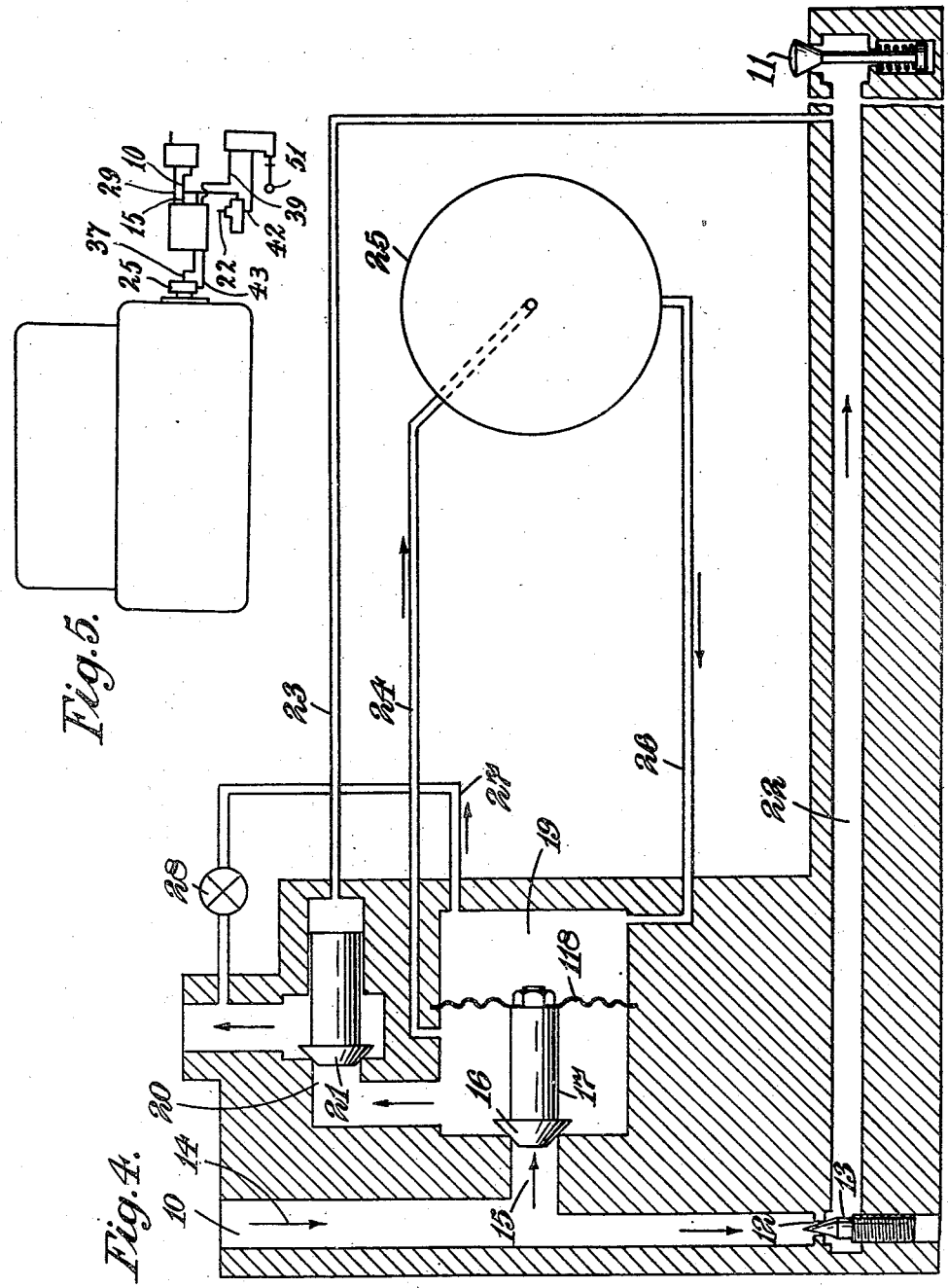

2,408,879

UNITED STATES PATENT OFFICE 2,408,879

CARBURATION APPARATUS FOR INTERNAL-COMBUSTION ENGINES AND THE LIKE

Cyril Alphonso Pugh, Ilford, England, assignor to The Plessey Company Limited, Ilford, England, a British company Application April 21, 1943, Serial No. 483,876
In Great Britain September 8, 1941

7 Claims. (Cl. 123—119)

This invention consists in improvements in or relating to carburation apparatus for internal-combustion engines and the like and has for its object to provide means whereby the fuel supply to the engine can be so controlled that any predetermined mixture strength can be maintained over the whole speed range of the engine.

This invention comprises a carburation system having in combination a fuel jet, a fuel conduit through which fuel is supplied under pressure to the jet, a centrifugally controlled pressure, relief valve opening from the fuel conduit, and a metering orifice in the fuel conduit situated at a position therein between the jet and the connection of the conduit with the pressure relief valve.

Conveniently, the system comprises also a centrifugal pump geared or otherwise connected to the engine to which fuel is to be supplied so as to run at engine speed or at a constant multiple of the engine speed, a pressure relief valve regulating chamber, a piston or diaphragm situated within the chamber and dividing it into two parts, an operative connection between the piston or diaphragm and the pressure relief valve, and conduits connecting the two parts of the chamber respectively with the inlet and outlet of the centrifugal pump.

In one form of the invention that part of the regulating chamber adjacent the relief valve is connected to the inlet to the centrifugal pump and also to the jet conduit or line, whereas the opposite part of the regulating chamber is connected to the fuel feed line and also to or near the periphery of the impeller of the centrifugal pump.

Thus, the centrifugal pump is connected across the two parts of the regulating chamber and tends to develop its pressure in opposition to that to which it is normally subjected by its connection to the pump feed line and to the jet line respectively.

Where it is necessary or desirable to introduce a correction to the jet pressure depending upon some variable factor such as the density of the air entering the engine, this may be obtained by varying the radial position of the outlet from the pressure regulating centrifugal pump radially with respect to the axis or centre of the impeller.

The foregoing and other features of the invention will now be described in connection with some preferred examples of the invention read in conjunction with the accompanying drawings, in which—

Figure 1 illustrates schematically a carburation system having the various parts arranged in accordance with the present invention;

Figure 2 is another schematic illustration of a modified form of the invention,

Figure 3 illustrates a detail of the adjustment for the outlet of the centrifugal pump;

Figure 4 shows a modification of the invention in a form similar to that illustrated in Figure 1; and Figure 5 is a schematic view showing the carburation system in its relation to the engine with which it is associated.

Like reference numerals indicate like parts in the several figures of the drawings.

In the schematic arrangement illustrated in Figure 1 it is to be understood that a positive displacement fuel delivery pump, not illustrated, is provided for supplying fuel in excess of requirements through a fuel line 10 to a fuel jet 11, or its equivalent through which fuel is supplied to the engine or the like. In the fuel line 10 is a metering orifice 12 controlled by a metering valve 13 which is adjustable in relation to the orifice in order to set the effective area of the orifice as required. Prior to reaching the metering orifice, considered in the direction of fuel flow from the pump, indicated by the arrow 14, is a branch conduit 15 leading to a pressure relief valve 16.

This valve as illustrated is in the form of a piston valve having a valve stem 17 connected to the valve 16 of say area $a$ and a larger piston face 18 of say area $b$. It is obvious that the valve 16 instead of being in the form of a piston valve could be in the form of a diaphragm-operated valve as shown in Figure 4 in which the larger area 18 is represented by the diaphragm 48 and is connected, for instance by a pin, being the equivalent of stem 17, to a valve such as 16. Whether valve 16 is a piston valve or a diaphragm-operated valve the following considerations apply equally in both cases. On that side of the piston 18 from which the valve 16 extends, the valve chamber 19 is provided with an outlet 20 leading to the suction side of the main pump or to a return line to the fuel tank past one surface of a balanced valve 21. The other surface of the valve 21 is in connection with the jet supply line 22 through a conduit 23 and the connection of the conduit 23 with line 22 is between the jet 11 and the metering orifice 12. The object of the balanced valve 21 is to cause the pressure in the relief valve chamber 19 that communicates with the low pressure side of the fuel supply system to be the same as that which exists in the passage between the metering orifice 12 and the jet 11.

Leading from the valve chamber 19 also on that side of the piston 18 from which the valve pin 17 extends is another conduit 24 leading to the suction side of a centrifugal pump 25. The outlet conduit 26 from the pump 25, that is to say, from the pressure side thereof, passes into chamber 19 on the other side of piston 18. Still another conduit 27 entering on the same side of the valve 18 as conduit 26, leads through a fixed or regulatable restriction 28 to the suction side of the pump.

With this arrangement, assuming the delivery pressure from the main pump to be represented by $P_2$, the pressure on the inlet side of the main control valve 16 to be $P_1$ and on the opposite side thereof to be $P_1+P$ it will follow that $$P_2 - P_1 = P \frac{b}{a}$$

where $P$=pressure rise across centrifugal pump.

The arrangement ensures that whatever change of pressure may occur either inside or outside the system the rate of delivery of fuel to the jet 11 will remain directly proportional to the engine speed, as the pressure difference across the orifice 12 is maintained by the centrifugal pump proportional to the square of the engine speed, and the flow through the orifice varies as the square root of the pressure difference across it.

It will be observed that pressure $P_1$ will exist in the connection between the metering orifice 12 and the jet 11 and that this pressure, which may be considered a datum pressure, is controlled by the jet 11 and the surrounding conditions.

The metering orifice 12 can be controlled by the needle valve 13 in order to adjust the size of this orifice for variation of mixture control to the engine or to correct for inlet air pressure or exhaust back pressure, that is to say, to alter the rate of flow or delivery of fuel to the jet 11. Whatever adjustment may be made, however, the result of that adjustment will remain as before constant and unaltered by changes of pressure inside or outside the system.

If desired, a light spring may be employed to assist in moving the relief valve 16 towards its closed position and thus to assist in starting the engine or in running at low speeds. Also a bleed may be provided near the eye of the impeller of the centrifugal pump in order to remove gas or vapour that may collect in this position and that would otherwise tend to impede the regular action of the centrifugal pump.

In the modified arrangement illustrated in Figure 2, the positive displacement fuel pump is indicated at 30 and the supply and return lines 10 and 29 respectively are shown in their connection to the pump. As in the previous example a metering orifice 12 and its associated needle valve 13 is arranged in line 10 between the branch conduit 15 leading to the pressure relief valve 16 and the jet line 22. In this case, however, the chamber 19 is substituted by two chambers 31 and 32 separated by a guide 33 which constitutes a seal in which valve stem 17 has a sliding fit. Within the chamber 32 the piston 18 (or its equivalent in the form of a diaphragm) is situated and divides the chamber 32 into two parts sealed off from one another and is capable of sliding to and fro within the chamber in accordance with movements of valve 16. That part of chamber 32 lying to the left of piston 18 may be considered as the low pressure part of the chamber, whereas that on the opposite side of piston 18 may be considered as the high pressure part. The latter part is connected by a duct 34 containing an adjustable restriction 35 to the fuel line 10 by way of a duct 36, and also by another duct 37 to a position at or near the periphery of the impeller of the centrifugal loading pump 25. The latter as before is mounted on or is geared to the engine shaft so as to rotate at engine speed or at a speed close to a constant multiple of engine speed. The low pressure part of the regulating chamber is connected by ducts 38, 39 through adjustable restrictions 40 and 41 and duct 42 to the jet line 22. A further branch conduit 43 connects the low pressure part of the regulating chamber to the inlet to the centrifugal pump 25.

The metering orifice 12, the area of which is controlled by the needle valve 13, may be made to have a definite relation to the induction pressure, temperature, exhaust back pressure, throttle opening, or any other engine variable or variables. Thus any adjustment which is the equivalent of that obtainable by means of the screw of valve 13 may be used to adjust the system for any of the engine variables specified. For instance, the valve 13 may be adjusted in accordance with the variables above-mentioned by a mechanism such as is described in United States Patent No. 2,383,563 and, in order to avoid unnecessary illustration this valve may therefore be considered as one which is automatically adjustable by the mechanism referred to.

In order to provide for adequate fuel pressure on starting, the pressure relief valve 16 is conveniently urged towards its closed position by means of a rod 44, one end of which enters the high pressure part of the regulating chamber 32 and communicates with and presses on the piston 18 or its diaphragm equivalent. The other end of rod 44 is formed as a piston 45 working within a starting pressure chamber 46 and that part of the latter which is nearer the regulating chamber is connected through a duct 47 with the pressure fuel feed line 10 by way of duct 36. The other part of the starting pressure chamber to the right of piston 45 is connected through a duct 48 with the fuel return line 29 and also contains the spring 49 normally urging piston 45 and rod 44 into engagement with piston 18 or its equivalent.

In operation, when the engine is not running, the pressure relief valve 16 will be held on its seat by the rod 44 under pressure of spring 49, the rod 44 and piston 45 being in the dotted-line positions illustrated. When, after starting, the pump delivery pressure reaches a predetermined minimum value, pressure of the fuel forces piston 45 to move against the action of its spring, thereby disengaging rod 44 from piston 18, thus freeing valve 16.

In order to explain more clearly the operation of the regulating arrangement above described the following analysis is given.

It is desired that for any given setting of the metering orifice 12, that is for given values of induction pressure, exhaust back pressure, etc., the delivery of fuel to a jet such as 11 shall be very nearly proportional or as nearly proportional as possible to the engine speed. This will be so if the pressure difference across the metering orifice 12 is proportional to the square of the engine speed and the amount of flow through the centrifugal pump is either so small as to be negligible compared with the flow through the metering orifice or is itself proportional to the square root of the pressure difference across the metering orifice. The second condition, in one form or the other, is easily satisfied by suitable design. As to the first, since the centrifugal pump 25 is geared to the engine, the pressure difference across it will be proportional to the square of the engine speed and so the requirements are reduced to the condition that the pressure difference across the metering orifice 12 shall be proportional to the pressure difference across the centrifugal pump. Now let $P_1$ = Pressure in feed line.
$P_2$ = Pressure in jet line.
$P_1^1$ = Pressure in high pressure part of the regulating chamber.
$P_2^1$ = Pressure in low pressure part of the regulating chamber.

Then $(P_1-P_2)$ is the pressure drop across the metering orifice, and $$(P_1^1 - P_2^1)$$

is the pressure drop across the centrifugal pump, while $$(P_1 - P_1^1)$$

is the pressure drop across the restriction 35 in the duct from the feed line to the regulating chamber 32, and $$(P_2^1 - P_2)$$

is the pressure drop across the restrictions 49 in the duct leading from the regulating chamber 32 to the jet line. It will appear that both $$(P_1 - P_1^1)$$

and $$(P_2^1 - P_2)$$

are positive, though at present it is only obvious that they must have the same sign, and that, for given settings of the restrictions 35 and 49 in these lines, they must be proportional, since both are caused by the same flow, i. e.

$$P_2^1 - P_2 = K_1(P_1 - P_1^1) \qquad (1)$$

where $K_1$ is a positive constant, depending on the relative settings of the two restrictions.

Now if

A = the area of the pressure relief valve face
= the area of the relief valve pin, and
B = the area of the piston or diaphragm in the regulating chamber Then for the equilibrium of the pressure relief valve, $$P_1A + P_2^1(B-A) = P_1^1B$$

i. e.

$$P_1 - P_2^1 = K_2(P_1^1 - P_2^1) \qquad (2)$$

Where $$K_2 = \frac{B}{A} \text{ and } K_2 > 1 \text{ since } B > A$$

Now from (2), subtracting $$(P_1^1 - P_2^1)$$

from each side, $$P_1 - P_1^1 = (K_2 - 1)(P_1^1 - P_2^1)$$

and multiplying by $K_1$, $$K_1(P_1 - P_1^1) = K_1(K_2-1)(P_1^1 - P_2^1)$$

i. e.

By (1), $P_2^1 - P_2 = K_1(K_2-1)(P_1^1 - P_2^1) \qquad (3)$ and so, adding (3) to (2), $$P_1 - P_2 = \{K_2 + K_1(K_2-1)\}(P_1^1 - P_2^1) \qquad (4)$$

so that the pressure drop across the metering orifice is proportional to the pressure drop across the centrifugal pump, which establishes the desired relationship. Since $K_2 > 1$ and $K_1 > 0$, it is clear that $$(P_1 - P_2) > (P_1^1 - P_2^1)$$

i. e.

$$(P_1 - P_1^1) > (P_2 - P_2^1)$$

and since $$(P_1 - P_1^1) \text{ and } (P_2 - P_2^1)$$

must have different signs it follows that $$P_1 - P_1^1$$

is positive, as I indicated above. This means that the flow in the centrifugal pump will be inwards, towards the centre of the impeller.

It will be seen from (4) above that the factor of proportionality depends on the relative adjustment of the restrictions in the lines, through the constant $K_1$, so that either one or both of them may be used for tuning. Furthermore, one or both of them may consist of two adjustable leaks in series. In the example just described, adjustable leaks 40 and 41 are shown to be in series and a valve 50 is provided to by-pass one of these two, namely, the leak 41. The by-pass valve 50 may be connected to the throttle as, for example, through the medium of cam 51 or it may be otherwise so controlled as to provide enrichment or weakening of the engine mixture during acceleration or during cruising or during any other desired operation.

The spindle 151 on which cam 51 turns may be considered as an element mechanically coupled to and consequently movable as an operative part of the throttle.

In addition to adjustment for tuning, the leaks may be so adjusted that their actual sizes will determine the flow through the centrifugal pump 25 and this may be adjusted to eliminate the production of vapour which might otherwise occur at the eye of the impeller.

For the purpose of tuning, it is desirable to be able to vary the radial position of the outer connection to the centrifugal pump 25. One such means for effecting this adjustment is illustrated in Figure 3 in which in the casing of the centrifugal pump near its periphery is formed a recess or pocket 52 and the upper surface of this pocket is closed by a disc 53 forming a continuation with the wall of the impeller chamber. In the disc 53 there is an outlet 54 communicating with the pocket beneath the disc 53 and any preferred mechanism illustrated by a rack and pinion linkage 55 may be utilised to rotate disc 53 about the axis of a central spindle 56 in order to vary the radial distance of the port 54. The chamber 52 communicates with lines 26 or 37 of the previously described examples.

Figure 5 shows schematically the relative disposition of the various parts of the carburation system in their relation to an engine shown in outline at 200. The principal portions of the carburation system are referred to by reference numerals corresponding to those employed above in connection particularly with Figure 2.

I claim:

1. A carburation system for supplying liquid fuel to an engine comprising in combination a fuel jet, a fuel conduit through which fuel is supplied under pressure to the jet, a pressure relief valve opening from the fuel conduit, a metering orifice in the fuel conduit situated at a position therein between the jet and the connection of the conduit with the pressure relief valve, a centrifugal pump to which fuel is supplied, means to drive the pump at a speed which maintains a constant relation to engine speed, a regulating chamber for the pressure relief valve, a transversely disposed movable element situated within the chamber and dividing it into two parts, an operative connection between the movable element and the pressure relief valve, and conduits connecting the two parts of the chamber respectively with the inlet and outlet of the centrifugal pump.

2. A carburation system according to claim 1 in which the transversely disposed movable element in the regulating chamber comprises a piston.

3. A carburation system according to claim 1 in which the transversely disposed movable element in the regulating chamber comprises a diaphragm.

4. A carburation system according to claim 1, in which the part of the regulating chamber which is nearer to the relief valve is connected to the inlet to the centrifugal loading pump and also to the low pressure side of the metering orifice, and the opposite part of the regulating chamber is connected in the region of the periphery of the impeller of the centrifugal loading pump and also to the high pressure side of the metering orifice, and in which the connections to the two parts of the regulating chamber from the two sides of the metering orifice contain adjustable leaks.

5. A carburation system according to claim 1, in which the part of the regulating chamber which is nearer to the relief valve is connected to the inlet to the centrifugal loading pump and also to the low pressure side of the metering orifice, and the opposite part of the regulating chamber is connected in the region of the periphery of the impeller of the centrifugal loading pump and also to the high pressure side of the metering orifice, and in which the connections to the two parts of the regulating chamber from the two sides of the metering orifice contain adjustable leaks, one at least of the adjustable leaks comprising two leaks in series in combination with a valve for by-passing one of the leaks together with an engine speed control element and means operatively connecting the last-mentioned valve to the said speed control element.

6. A carburation system according to claim 1, in which that part of the piston chamber which is connected to the inlet of the centrifugal pump is in connection with the return side of the relief valve and is combined with a further balanced relief valve situated on the return side of the main relief valve and chamber for the said further balanced relief valve, one end of which chamber is connected to the low pressure side of the metering orifice so as to equalize the pressure on the low pressure sides of the relief valve and the metering orifice.

7. A carburation system according to claim 1 in which said pump has an impeller, characterized by means for varying the effective radius of the impeller for the purpose of tuning.

CYRIL ALPHONSO PUGH.